United States Patent [19]
DiGiovanni et al.

[11] Patent Number: 5,187,759
[45] Date of Patent: Feb. 16, 1993

[54] HIGH GAIN MULTI-MODE OPTICAL AMPLIFIER

[75] Inventors: David J. DiGiovanni, Scotch Plains; Clinton R. Giles, Middletown; Stuart A. Kramer, Fair Lawn, all of N.J.; Gerald Nykolak, Brooklyn, N.Y.; Herman M. Presby, Highland Park; Jay R. Simpson, Fanwood, both of N.J.

[73] Assignee: AT&T Bell Laboratories, Murray Hill, N.J.

[21] Appl. No.: 788,952

[22] Filed: Nov. 7, 1991

[51] Int. Cl.⁵ .................. G01S 3/30; H01S 3/30; G02B 6/22
[52] U.S. Cl. ........................... 385/27; 372/6
[58] Field of Search ............ 372/1, 6; 385/27, 12, 385/127

[56] References Cited

U.S. PATENT DOCUMENTS

| | | | |
|---|---|---|---|
| 4,815,079 | 3/1989 | Snitzer et al. | 385/127 X |
| 4,955,025 | 9/1990 | Mears et al. | 372/6 |
| 5,096,277 | 3/1992 | Kleinerman | 385/27 X |

Primary Examiner—Akm E. Ullah
Attorney, Agent, or Firm—Charles E. Graves

[57] ABSTRACT

Indiscriminately exciting the modes of a multi-mode optical fiber amplifier is avoided by an optical fiber amplifier design in which the excitation of pump modes in the core of a multi-mode fiber is controlled by controlling the pump light launching. The pump light is directed substantially along the center axis of a multi-mode fiber within a predetermined launch angle. Rather than exciting all modes, only lower order modes are affected.

11 Claims, 3 Drawing Sheets

HIGH GAIN MULTI-MODE OPTICAL AMPLIFIER

FIELD OF THE INVENTION

This invention relates to optical fiber amplifiers and, particularly, to such amplifiers used in association with multi-mode optical fibers.

BACKGROUND OF THE INVENTION

Heretofore, work on optical fiber amplifiers has been concentrated on single mode fibers. An example of a design for an optical fiber amplifier using a single mode fiber is contained in the disclosure of U.S. Pat. No. 5,005,175, Desurvire et al, issued Apr. 2, 1991. This disclosure to the extent relevant is hereby incorporated by reference.

Extending the use of optical fiber amplification to multi-mode fibers is attractive because of the use of multi-mode fibers in applications such as local area networks, switching systems, and fiber sensors.

In optical fiber amplifier designs for single mode fibers, optical noise generally is not so large so as to limit the optical amplifier's usefulness. Noise is proportional to the number of propagating modes, as well as the degree of population inversion along the amplifier length. In such applications, noise generated in the amplification process is limited by the fact that only two orthogonally polarized modes are propagating in the fiber amplifier. In adapting multi-mode fibers to optical fiber amplifiers, however, noise generation incident to the amplification presents a complex set of issues.

The amount of noise generated is related to the number of modes that can be guided in the multi-mode fiber. Signal amplification, however, is dependent on the overlap between signal modes and excitation pump modes within the fiber regions containing concentrations of dopant such as erbium. For the case of a uniformly doped multi-mode fiber core, as the number of pump modes increases, signal gain increases; however, a point is rapidly reached at which the number of excited noise modes is high enough to overwhelm the multi-mode signal with noise. It follows, therefore, that if all or even most of the hundreds of modes of a multi-mode fiber amplifier are exited by the pump, the resulting noise factor is too high to allow optical amplification for any practical system application.

OBJECT OF THE INVENTION

Accordingly, one object of the invention is to realize a high gain, low-noise multi-mode optical fiber amplifier.

A further object of the invention is to introduce useful levels of optical fiber amplification into local area networks and other optical fibers systems which use multi-mode optical fibers.

SUMMARY OF THE INVENTION

The disadvantages of indiscriminately exciting the modes of a multi-mode optical fiber amplifier are overcome pursuant to the invention by an optical fiber amplifier design in which selective excitation by the pump of only limited ones of the available modes occurs.

In one embodiment, high gain amplification is achieved by limiting the excitation of pump modes in the core of a multi-mode fiber, through carefully controlled launching of the pump light into the multi-mode fiber amplifier. The pump light is directed substantially only along the center axis of a multi-mode fiber, and at a predetermined launch angle. Rather than exciting all modes, or even a significant subset of the excitable modes (for example, scores of modes out of hundreds of possible excitable modes), the controlled pump light launching along the center axis excites only lower order modes.

The pump signal may be introduced from the semiconductor laser into the multi-mode fibers in a variety of ways, such as, for example, through a set of lenses. The specific launching techniques as well as doping regimes will be described hereinafter.

The invention and its further objects, features and advantages will be further appreciated from a reading of the detailed description of illustrative embodiments which follow.

DETAILED DESCRIPTION OF ILLUSTRATIVE EMBODIMENTS

Figure 1:
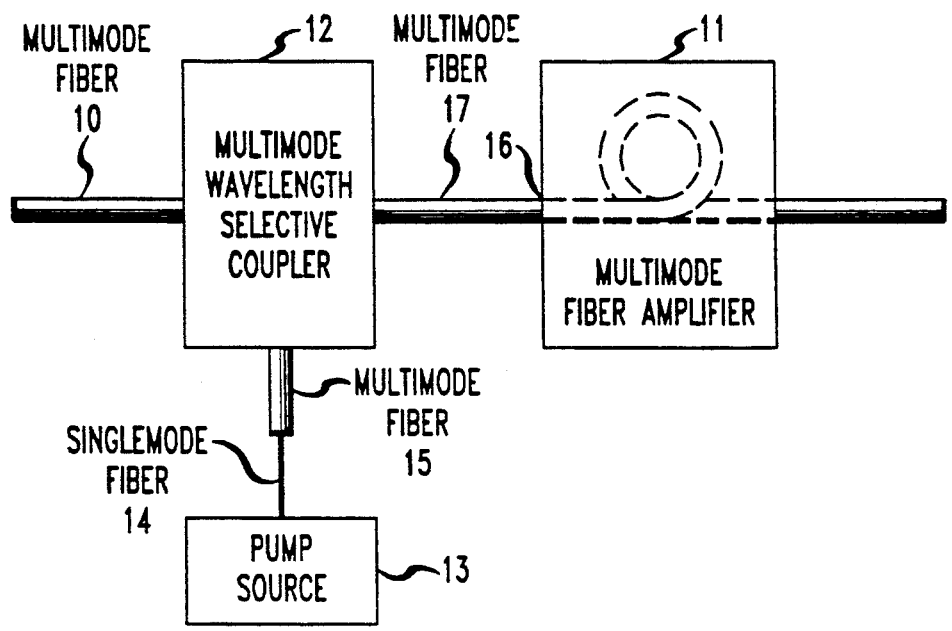
FIG. 1 is a block diagram of a system employing a multi-mode fiber amplifier and other components.

In FIG. 1, a multi-mode fiber 10 is connected to a multi-mode fiber amplifier 11, through a multi-mode wavelength-selective coupler 12. The coupler, shown in detail in FIG. 2, consists of lenses 18, 22 and 24, and a dichroic filter 20. The lenses 18 and 22 collimate the light emitted from the input signal and pump fibers. The collimated beams are either transmitted or reflected by the dichroic filter, which combines both signal and pump beams into one collimated beam which is focused onto the output fiber by the lens 24.

A pump source 13 is connected to coupler 12. Lasers are efficient pump sources, with the choice of laser being dependent on the type of active ion used. If the active ion dopant is erbium, a semiconductor laser is selected which emits at any of the suitable pump wavelengths for erbium; i.e., 514 nm, 720 nm, 820 nm, 980 nm, or 1480 nm. Source 13 is connected through a single-mode fiber 14 and a connected multi-mode fiber 15 to coupler 12. Alternatively, the connection between pump 13 and coupler 12 can be through a direct single-mode or direct multi-mode optical fiber link.

An optical signal, which is multi-moded, is present on fiber 10. Coupler 12 is connected to amplifier 11 by a length of multi-mode fiber 17 which is substantially the same in physical character as fiber 10.

The output of the coupler 12 is applied at the input end 16 to multi-mode fiber amplifier 11. The signal power in connecting fiber 17 is distributed among many propagating modes. At the input end 16, the pump power, however, is distributed to just a few of the lower order modes in accordance with the invention. The coupling at input end 16 of the pump to the multi-mode fiber amplifier must be one which preserves the established pump modal distribution. This coupling can be a fusion splice or a mechanical fiber coupler such as rotary mechanical splices.

The modal distribution of the pump is controlled predominantly by the connection between fibers 15 and 14. However, both the wavelength selective coupler 12 and the fiber connection 16 can also influence the modal power distribution.

To ensure low order excitation in fiber 15, a relatively small 8 μm diameter single-mode fiber 14 is connected to the exact center of the much larger (i.e., 52-62 μm core size) multi-mode fiber 15. All the power in fiber 14, therefore, propagates within the core of the multi-mode coupler 12, because the single-mode character of the pump 13 is confined and preserved in fiber 15 and into fiber 17 as well. In fiber 17, the information signal if multi-mode.

Figure 2:
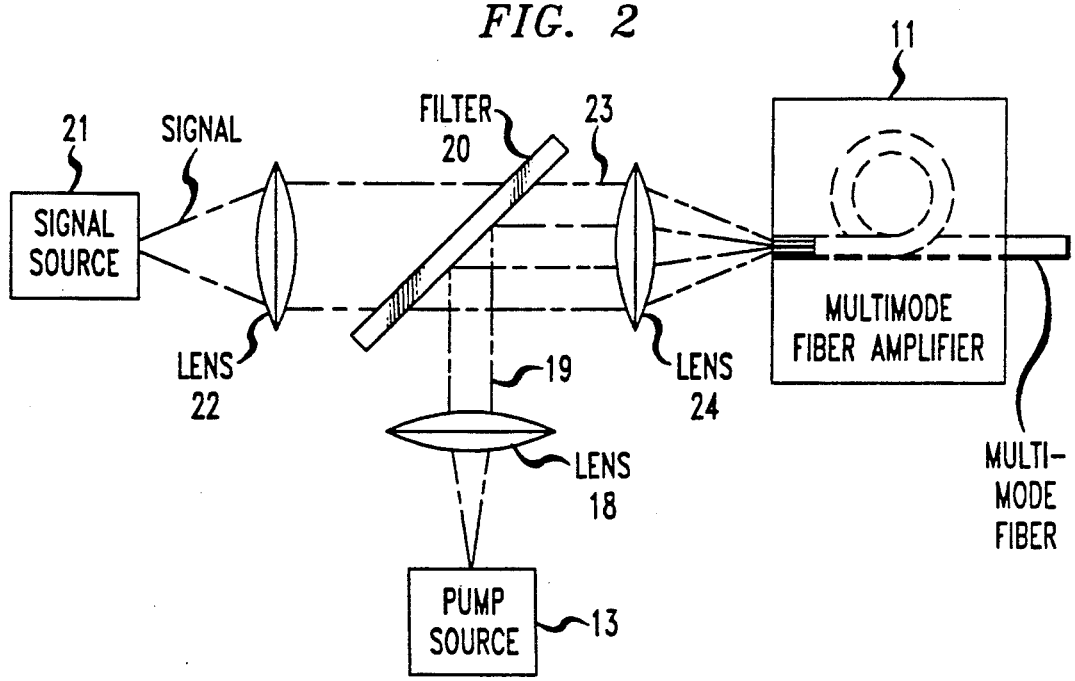
FIG. 2 is a schematic diagram of the system of FIG. 1 in which the coupler is detailed.

One method for introducing the pump signal is illustrated in FIG. 2. There, the pump signal from source 13 is fed to a lens 18 which collimates the pump light into a beam 19 and directs it to a dichroic filter 20. The information signal form a signal source 21 is fed to filter 20 through a lens 22 which collimates the signal light. The collimated signal impinges on the filter 20 where it combines with the pump signal. The combined light, denoted 23, contains the pump energy in its center region and signal energy over a broader region.

As seen in FIG. 2, this combined light is launched into multi-mode fiber amplifier 11 through a lens 24 under such conditions as to focus the combined beam 23 on the center of the input end of fiber amplifier 11.

The number of exited modes in a multi-mode fiber depends on the numerical aperture (NA) of the launch conditions. A small launch NA excites few modes; a large launch NA excites many modes. By minimizing the launch angle, as described hereinafter, the number of exited modes is minimized. The multi-mode amplifier element 11 advantageously is a length of optical fiber with a rare earth dopant distributed uniformly along the length of its core.

For a suitable pump source, such as a semiconductor laser, and given a particular active element dopant in the fiber amplifier, the pump launch conditions will greatly influence the type and number of excited modes in the multi-mode fiber amplifier. By controlling one or more of the launch conditions (launch angle, intensity distribution and the degree offset of the incoming light with respect to the center axis, for example), the laser excites only a few lower order modes.

The maximum number of propagating modes in a multi-mode fiber is determined by the fiber geometry, the refractive index profile of the fiber, and the wavelength of excitation. For example, for step index multi-mode fiber:

$$N_{modes} \approx \frac{V^2}{2}, \quad (1)$$

for graded index multimode fiber:

$$N_{modes} \approx \frac{V^2}{4}, \quad (2)$$

further:

$$V = \frac{2\pi}{\lambda} r(N_{core}^2 - N_{clad}^2)^{\frac{1}{2}} \quad (3)$$

where
r = core radius
λ = wavelength
$N_{core}$ = index of core
$N_{clad}$ = index of clad.

From the preceding, the conclusion may be drawn that the upper limit of propagating modes in a multi-mode optical fiber typically is 500 to 600 modes. Further information on the dependence of the number of excited modes on launch conditions is found in "Optical Waveguide Theory," A. W. Snyder and J. D. Love, Chapman and Hall, New York, 1983.

Figure 5:
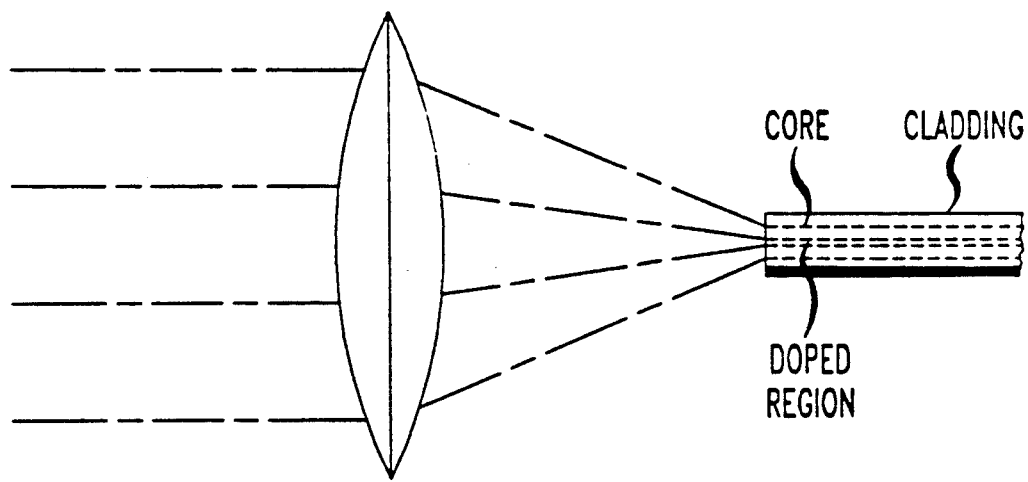
FIG. 5 is a diagram showing the launch angle of the overlapped signal into the amplifier.

The launch angle, depicted in FIG. 5, must be not greater than about 10-12 degrees. There is no benefit, however, in trying to get a very small numerical aperture from smaller launch angles significantly less than about 10 degrees, because there are limits to how small a collimated beam can be formed using lenses.

Figure 3:
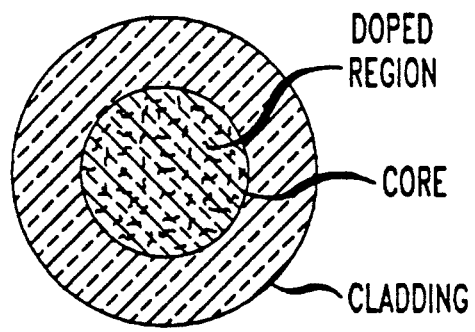
FIGS. 3 and 4 are cross-sections of two multi-mode optical fiber amplifiers with different core dopant regimes.

Several alternative core doping schemes may be employed. In a first scheme, shown in FIG. 3, the core doping is made to be of uniform concentration across the entire core section of the multi-mode fiber core. A uniformly doped core lends itself to the selective limiting of excited modes of the multi-mode fibers by limiting the launching of the pump light. Selective mode excitation has already been described in FIGS. 1 and 2. The uniformly doped fiber does not of itself limit the modes, however. It should be understood that only the launching conditions limit the number of excited modes in the uniformly doped fiber.

Figure 4:
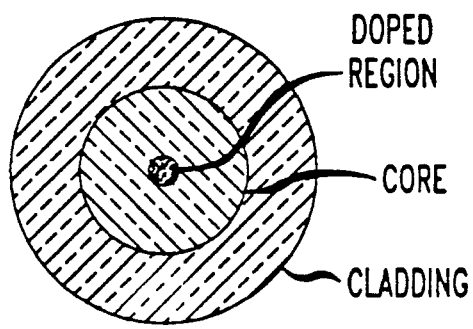

In a further embodiment, the multi-mode fiber core is doped in its center region only, as shown in FIG. 4. By limiting the active region of a multi-mode fiber to a subsection of the core, the number of propagating modes is limited to those modes which propagate in the reduced active core.

Figure 6:
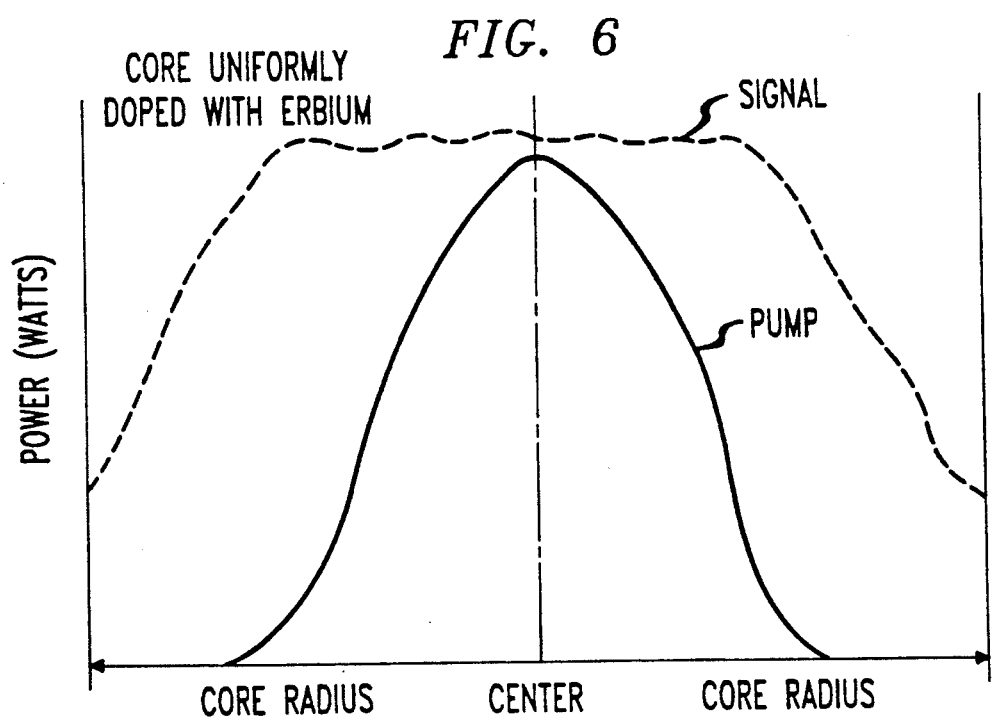
FIGS. 6 and 7 are graphs illustrating the idea of overlap between the pump signal and an optical information signal.
Figure 7:
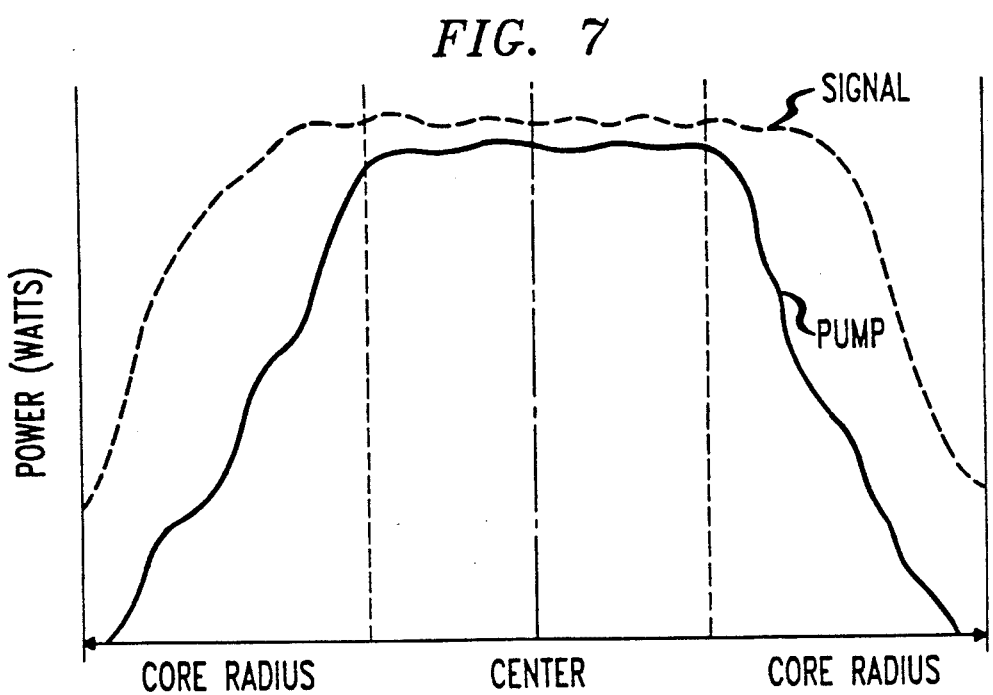

For amplification to occur, the excited modes of a pumped, core-doped multi-mode fiber must overlap to some extent with the signal modes. FIG. 6 illustrates the concept of overlap in relation to a core which is doped uniformly across its entire diameter and where the pump power is propagating in the lower order modes. FIG. 7 illustrates the concept of overlap in relation to a core where the doping is limited to a partial cross-section area of the core.

The overlap integral between the dopant and the optical mode can be expressed as:

$$\Gamma_k^m = \int_0^{2\pi} \int_0^b l_k^m(r,\theta) r \, dr \, d\theta \quad (4)$$

where
$l_k^m(r,\theta)$ is the normalized intensity distribution of the m-th propagating mode at the k-th wavelength (signal or pump), and
b is the radius of the doped region.

With increasing overlap, a larger number of excited modes can propagate; and, as a consequence, the generation of noise also increases. To optimize amplification without at the same time overwhelming the system with noise presents a problem to which the present invention provides a solution.

It has been determined that a reasonable operating condition has less than ~20% of the pump light converted to ASE. The analysis is as follows. Consider a case where Pump Power = $P_{pump}$ = 50 mW Noise Power = $P_{ASE}$ = $\frac{1}{5}$ (50 mW).

It can be shown that:

$$P_{ASE} \approx N_{modes} \cdot N_{sp} \cdot (G-1) \cdot h \cdot \gamma \cdot \Delta\gamma \tag{5}$$

where

G = optical gain (linear units)
$N_{sp}$ = amplifier inversion factor
h = 6.6 × 10$^{-34}$ watts-sec$^2$
$\gamma$ = 1.93 × 10$^{14}$ Hz with $\lambda$ = 1550 nm
$\Delta\gamma$ = optical bandwidth (~50 nm)

and $$N_{modes} \cdot N_{sp} \approx \frac{P_{ASE}}{(G-1) \cdot h\gamma\Delta\gamma} \tag{6}$$

Then, for am amplifier with 20 dB Gain (100):

$$N_{modes} \cdot N_{sp} \leq 125; \text{ or } N_{modes} \leq \frac{125}{N_{sp}} \tag{7}$$

$N_{sp}$ is always greater than or equal to 1, where $$N_{sp} \geq 1 \text{ and } N_{modes} \leq 125 \tag{8}$$

Thus, the number of modes for the example for which there is this 20 dB of gain, has to be less than 125.

As noted, a uniformly doped optical fiber cross-section which is uniformly pumped is more prone to generating noise because of the increased number of optical modes having significant gain under uniform pumping conditions. However, the uniformly doped inventive embodiment has the advantage of ease of fabrication.

It is known that rare earth dopants including erbium, neodynium and praseoldymium are capable of creating sites which are excitable to energy levels appropriate for amplifying optical signals. Neodynium and praseoldymium are useful dopants for multi-mode amplifier because of their 4-level amplification characteristics, where the unpumped regions of the core would not absorb signal as readily as the 3-level erbium case.

This invention describes multi-mode optical fiber amplification at particular wavelengths when using erbium as a dopant. Amplification at different wavelengths may be achieved using neodynium or praseoldymium.

We claim:

1. Apparatus for amplifying signals in a multi-mode optical fiber information transmission system, comprising:

an input multi-mode fiber for containing a multi-mode information signal;

an amplifier element comprising a length of optical fiber having a region of active ions disposed in the fiber core;

a multi-mode wavelength-selection coupler disposed between said input fiber and said amplifier element, comprising means for combining said information signal and said pump excitation energy into a single collimated beam;

a pump source of excitation energy for exciting selected ions of said active ion region;

means for connecting said pump source to said coupler, and means for controlling the launch angle of said single collimated beam into the input end of said optical fiber amplifier element to an included angle of no greater than substantially 12 degrees in relation to the axis of said optical fiber of said amplifier.

2. Apparatus in accordance with claim 1, wherein said means for connecting said pump source to said coupler comprises a connecting length comprising a single-mode fiber and a connected multi-mode fiber, the end of said single-mode fiber being connected to said pump and the end of said multi-mode fiber being connected to said coupler.

3. Apparatus in accordance with claim 2, wherein said pump source is a semiconductor laser.

4. Apparatus in accordance with claim 3, wherein said active ion region comprises implantations of erbium.

5. Apparatus in accordance with claim 4, wherein said laser emits at a wavelength selected from the group consisting of 514, 720, 820, 980, or 1480 nanometers.

6. Apparatus in accordance with claim 5, wherein said connecting length comprises a relatively small diameter single-mode fiber and a relatively substantially larger diameter multi-mode fiber.

7. Apparatus in accordance with claim 6, wherein the diameter of said smaller fiber is substantially 8 microns, and the core size of said relatively larger diameter fiber is substantially 52–62 microns.

8. Apparatus in accordance with claim 7, wherein the center of said collimated beam enters said optical fiber amplifier substantially at the axis of said optical fiber amplifier.

9. Apparatus in accordance with claim 8, wherein said launch angle is in the range of 10–12 degrees.

10. Apparatus in accordance with claim 9, wherein the active ion region comprises the entire core of said optical fiber amplifier element.

11. Apparatus in accordance with claim 10, wherein the active ion region comprises a selected portion of the cross-section of the core of said optical fiber amplifier element.

* * * * *